Aug. 10, 1965
A. BERGER ETAL
3,199,292
COMBINATION OF A FREE TURBINE WITH
A PLURALITY OF GAS GENERATORS
Filed June 5, 1962
3 Sheets-Sheet 1
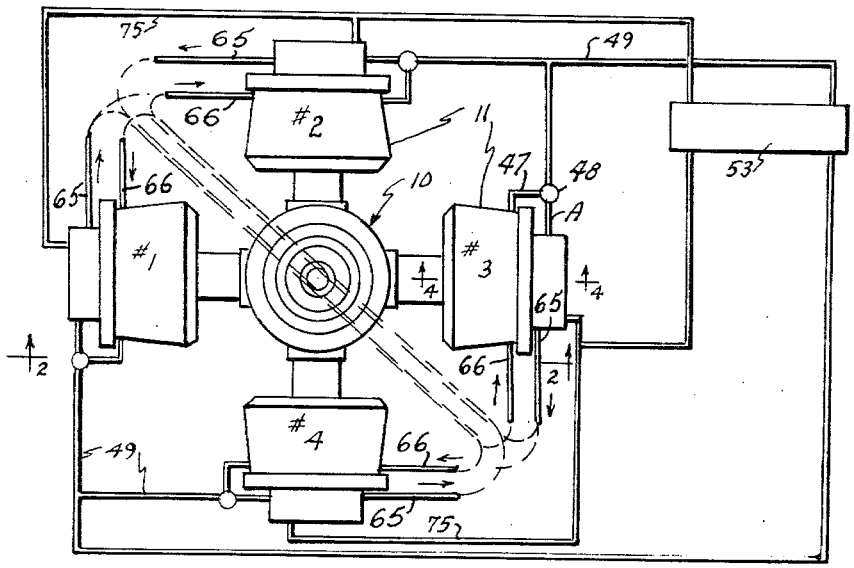
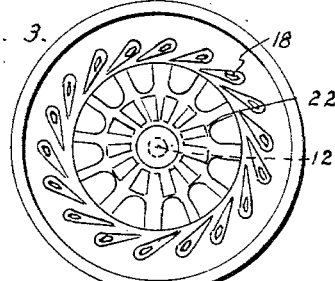
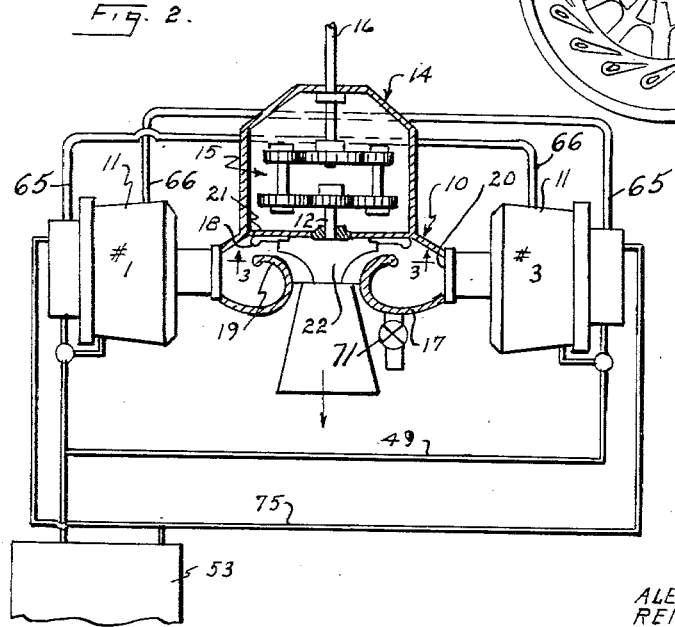
INVENTOR.
ALEXANDRE BERGER
RENE A.M. TOESCA
BY
*Howard J. Jeanson*
AGENT

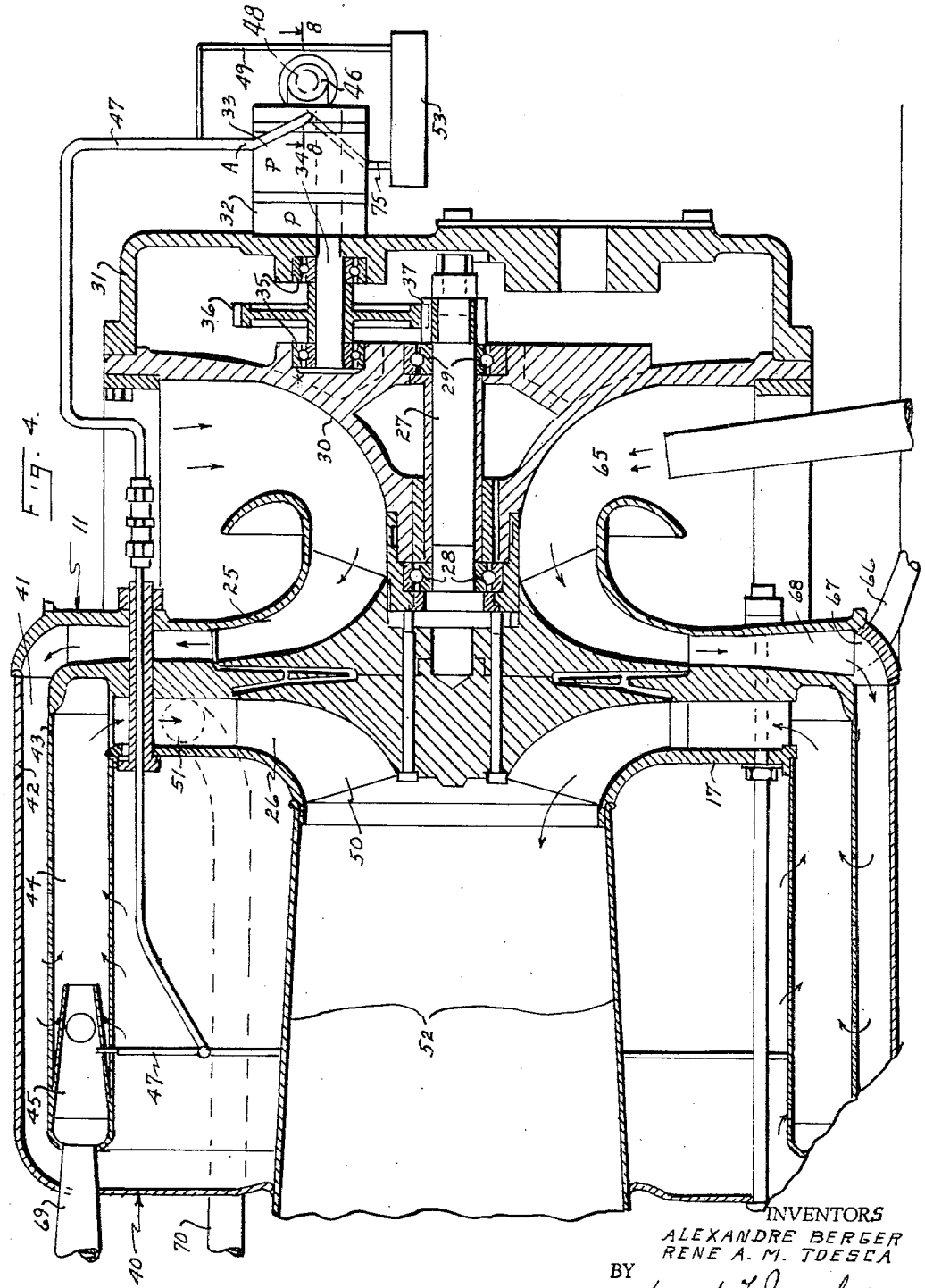

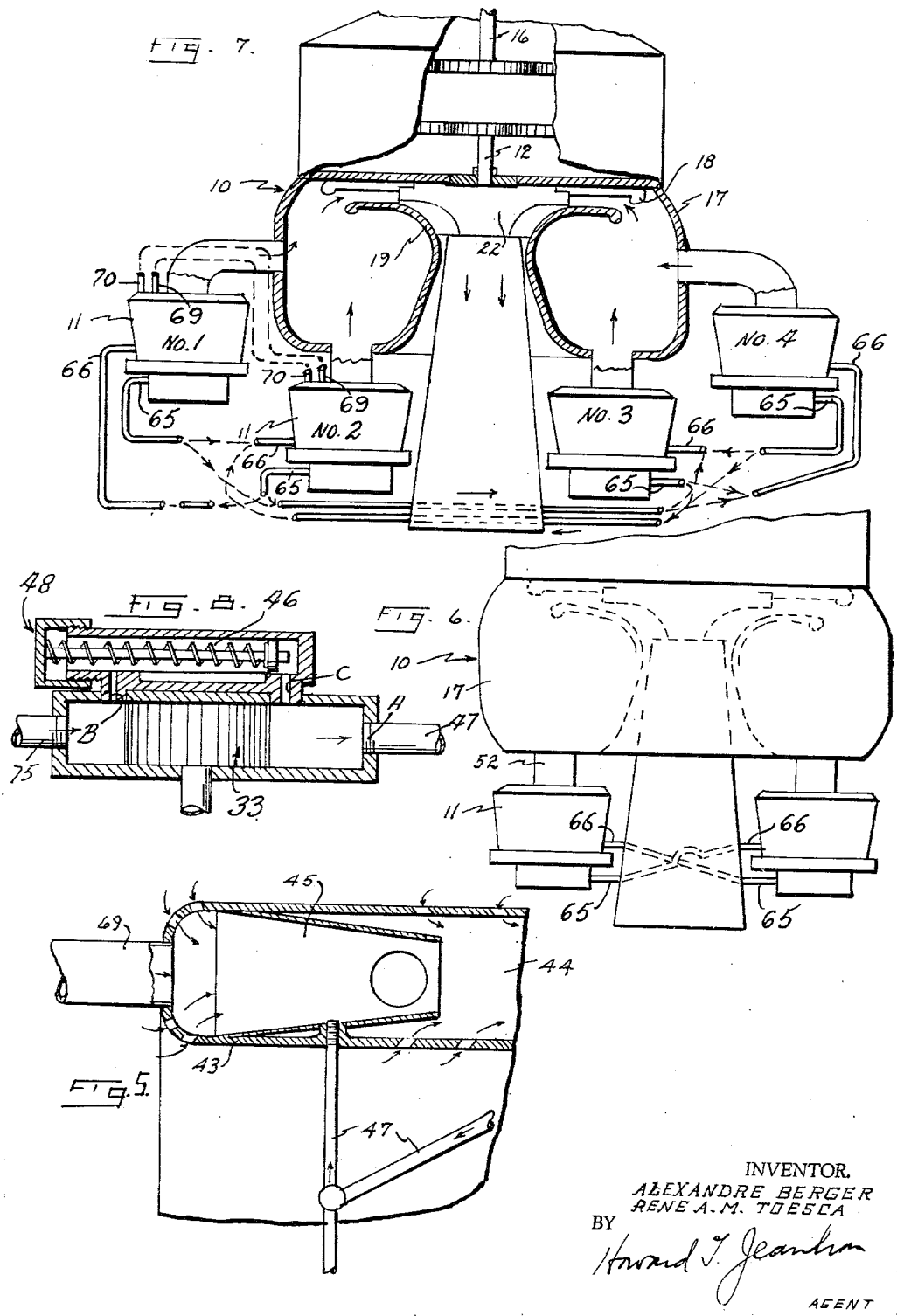

United States Patent Office 3,199,292
Patented Aug. 10, 1965

3,199,292
COMBINATION OF A FREE TURBINE WITH A PLURALITY OF GAS GENERATORS
Alexandre Berger, Pottstown, and Rene A. M. Toesca, Boyertown, Pa. (both % Energy Transformation Corp., 230 S. Reading Ave., Boyertown, Pa.)
Filed June 5, 1962, Ser. No. 200,185
1 Claim. (Cl. 60—39.16)

This invention relates to a free turbine that is fed by more than one gas generator and more particularly to a symmetrically positioned combination of gas burners that are utilized to generate a flow of gas to power a free turbine.

Gas turbines acting as prime movers have been too large and too heavy and the efficiency of a gas turbine is only obtainable at extremely high r.p.m. The turbines are operated at speeds as high as 60,000 r.p.m. The turbines are also required to drive the accessories (fuel and oil pumps, electric generator and controls) and they are necessarily connected to heavy gear boxes to reduce their operating r.p.m. to a usable rotor r.p.m. The turbines also require a heavy electrically driven starting power thus compounding an engine to an extremely heavy weight. In this invention the gas turbine has been reduced to the lightest form as a free gas turbine and the gas generator has been divided into opposed pairs of gas generators that may be symmetrically positioned with relation to the free gas turbine. The starting electric load is reduced due to the smaller size gas generator reducing weight and all generators have been interconnected to permit starting one generator initially and starting each of the other generators from the one originally started. The total horsepower required for the free gas turbine is thus divided into 2, 4, 6, etc., gas generators and any one gas generator may be operated at a high speed for efficiency to produce half or one quarter or the ratio of the number of gas generators added to provide operation of the free gas turbine at lower loads without losing the efficiency of the operation of the gas generator.

One of the objects of this invention is to utilize one or more centripetal gas generators at their maximum efficiency to power a single free turbine.

Another object of this invention is to utilize paired centripetal gas generators in opposed relation at their maximum efficiency to power a free turbine.

A further object of this invention is to divide the power input for a free gas turbine into a plurality of symmetrically positioned gas generators so that one or more may be used according to the power demand.

A still further object of this invention is to divide the power input for a free gas turbine into a plurality of symmetrically positioned gas generators so that one or more provide the necessary power input in the event of failure of any one.

A further object of this invention is to divide the input power of a free gas turbine into a plurality of gas generators and reduce the degree of starting power per horsepower and provide the means of starting each of the remaining gas generators from the first one started.

A still further object of this invention is to provide a plurality of gas generators that are positioned symmetrically with respect to the center shaft of a free gas turbine and in which the center lines of the gas generators intersect the center line of the center shaft of the free gas turbine to which they are connected.

Another object of this invention is to utilize symmetrically positioned gas generators with relation to a free gas turbine and provide a wider and better distribution of weight for an aircraft installation.

Other objects of this invention shall be apparent by reference to the accompanying detailed description and the drawings in which FIG. 1 is a plan view of a gas turbine with symmetrically positioned radial gas generators, FIG. 2 is an elevational view partially in cross section taken on line 2—2 of FIG. 1, FIG. 3 is a plan view taken on line 3—3 of FIG. 2, FIG. 4 is an enlarged cross sectional view of a gas generator taken on line 4—4 of FIG. 1, FIG. 5 is an enlarged detail of the vaporizer chamber of FIG. 4, FIG. 6 is an elevational view partially in cross section of a further embodiment, FIG. 7 is an elevational view partially in cross section of a still further embodiment, and FIG. 8 is a cross sectional view of the relief valve and fuel pump taken on line 8—8 of FIG. 4.

Referring to the drawings there is illustrated a free gas turbine 10 in combination with a plurality of opposed pairs of gas generators 11 in which the gas generators are symmetrically positioned with relation to the free gas turbine 10. Referring to FIG. 2 the free gas turbine is mounted on a central shaft 12 which extends into a gear box 14 and gear box 14 through its transmission gearing 15 in turn drives a rotor shaft 16. The free gas turbine 10 is comprised of an outer case 17 enclosing a plurality of turbine nozzles 18 with a turbine shroud 19 and the turbine case 17 is provided with inlet ports 20 to which the gas generators 11 are connected. In FIG. 2 there is shown a pair of gas generators 11 mounted in opposed relation to feed into the turbine outer case to provide the necessary gas flow through the turbine nozzles 18, this flow passing through between the nozzle plate 21 and the turbine shroud 19 to rotate the impeller 22, FIGS. 2 and 3, the impeller 22 in turn driving shaft 12 which through the transmission 14 drives the rotor shaft 16.

Referring to FIG. 4 there is illustrated a cross sectional view of a typical gas generator 11. The gas generator comprises a centrifugal compressor 25 that is driven by a radial inflow turbine 26. Both are mounted on a common shaft 27. Shaft 27 is supported in a pair of bearings 28 and 29; the bearings are in turn supported in a frame 30 and frame 30 is retained within a housing 31. Also supported by the frame 30 and mounted exterior to the housing 31 are the accessories, oil pump 32 and fuel pump 33, which are mounted on a shaft 34 which extends through a pair of bearings 35. Shaft 34 is provided with a gear 36, gear 36 meshing with a gear 37 that is mounted on the main shaft 27. The housing 31 at its opposite end supports a gas burner 40. The gas burner is formed as a round donut shaped shell with the air inlet 41 adjacent the periphery of the outer shell 42 and provided with an inner circular shell 43 that is perforated to allow the compressed air charged into the burner to flow into the burning chamber 44. The burner 40 is completely enclosed on the end opposite from the inlet end 41. Shell 43 is also enclosed at the end adjacent the closed end of shell 40. At this end of shell 43 there is provided a vaporizer chamber 45 to permit spraying and discharging the fuel that is to be burned in chamber 44. The fuel is sprayed into the vaporizer chamber 45 through a line 47. Line 47 is connected to the discharge port A of the fuel pump 33. The discharge side of the fuel pump 33 is also connected through port C to the relief valve 48 so that the fuel pressure will be exerted on the relief valve. The relief valve 48 may be mounted as shown in FIG. 1 (separated from the pump) or as shown in FIG. 8. However in FIG. 8 there is no return line 49 necessary. The fuel inlet side of the fuel pump 33 is also connected by a line 75 to a tank 53. It is apparent with the fuel pump 33 operating the fuel will be discharged through C to the relief valve 48 and through port A to line 47 to the vaporizing chamber 45. Relief valve 48 may be adjusted to thus adjust the desired fuel pressure discharged through line 47. The burner 40 and specifically the burner shell 43 and chamber 44 are connected to the turbine 26 through the inlet passage 51 to drive the turbine 26. The burning gases passing through turbine 26 rotate the turbine blades 50 and are expelled through the exhaust pipe 52. The rotation of turbine 26 drives the compressor 25 maintaining the necessary air flow through the burner chamber while the pump 33 which is also driven by turbine 26 maintains a fuel supply pressure through relief valve 33 and the discharge pressure of the fuel is practically equal to the compressor air pressure entering chamber 44. There is very little pressure drop between relief valve and the combustion chamber. Also there is very little pressure drop between the compressor and the combustion chamber. Maintaining a predetermined constant compressor pressure, the speed of the turbine will vary ±3.5% when the load changes using a .060" orifice on the vaporizer line. No mechanical overspeed is necessary. If the turbine accelerates, the fuel pump 33 also is accelerated but the relief valve 48 opens to discharge the excessive fuel pressure and thus regulates the fuel pressure supplied through line 47. The relief valve FIG. 8 allows the increased fuel pressure to bypass through port C, through the relief valve and be returned through port B to the fuel inlet side of the fuel pump. Thus the fuel supply pressure remains constant. The predetermined operating speed can be adjusted manually by changing the relief valve setting, FIG. 8, that is, changing the spring 46 in the relief valve 48. In the event there is an increase in r.p.m., the fuel pump pressure increases and this pressure acts upon relief valve 48 to open the relief valve. As soon as the pressure in the combustion chamber 44 is reduced and the r.p.m. drops, the relief valve 48 will close and the fuel supply will again be maintained at the desired predetermined pressure in the combustion chamber, this pressure being the predetermined driving pressure for the turbine 26 at its most efficient rate. The supply tank 53 is connected to pump 33 by a line 75 in FIG. 4. However, with a plurality of burners 11 as in FIG. 1 or FIG. 2, line 75 may be divided to supply all of the burners from a single fuel tank 53.

The gas generator illustrated in FIG. 4 may be started pneumatically with low pressure air produced either by a fan driven by a starting motor or by a crank with a step up gear arrangement. No special nozzle is needed, rather the air is directed into the compressor inlet 65 (FIG. 4). With an air pressure of 9" of water (corresponding to 0.15 horsepower), the basic engine (compressor 25) accelerates to 18,000 r.p.m. in 8 seconds. The fuel pump 33 supplies the desired fuel pressure and a control (not shown) ignites the fuel in the burner chamber 44 to pick up the r.p.m. from its starting acceleration of 18,000 r.p.m. to the predetermined operating r.p.m. The gas generator then produces the desired gas flow through the exhaust pipe 52. In a similar fashion, one gas generator 11 (FIGS. 1, 2, 6 and 7) after it has been started may be utilized to start any other gas generator. When it is desired to use one gas generator 11 to start another, an auxiliary line 66 may be connected in a port 67 (FIG. 4) adjacent the compressor diffuser 68 of the compressor 25. Line 66 (FIGS. 1, 2, 6 and 7) is extended to the inlet 65 of the gas generator that is to be started. A still further manner of starting one gas generator from another gas generator that is operating is also done pneumatically by connecting the operating combustion chamber 44 through line 70 to an inlet port 69 (FIG. 7) of the burner chamber to be started and at the same time using the line 66 to the inlet 65 of the generator to be started. Thus in this instance, using gas generator No. 1 (FIG. 7) to start No. 2 in addition to revving up the compressor to 18,000 r.p.m., the burning gas from burner 44 passing through an auxiliary line 70 to the inlet port 69 provides an immediate operation of the adjacent burner. In any system or installation of the free gas turbine in which two or more of the described gas generators is to be utilized the control of the gas generators is fairly simple as with a pneumatic starting of any one generator, that is, with the air pressure revving up the compressor and the fuel introduced into the vaporizer chamber 45 (FIG. 4) and ignited, the burner chamber 45 provides the necessary gas flow to drive the turbine 26 which maintains the gas generator in operation as long as the fuel pump is operating and the generator will operate at a predetermined efficient r.p.m. which does not vary more than ±3.5%. As already described, the speed signal or the reaction to any increase in generator r.p.m. automatically cuts off the fuel supply to provide a fail safe operating gas generator. The control of the free turbine is manual. In an aircraft it is pilot control and generally includes an overspeed protection. This manual control includes not only the means of braking the speed of the rotor shaft but must also include valve means 71 of exhausting or bypassing the generated gas from the case 17 (FIG. 2) to prevent driving the free gas turbine rotor when the braking or reduction in r.p.m. is desired.

Referring to FIG. 6 there is illustrated a further embodiment of this invention in which the gas generators 11 preferably in pairs and preferably positioned symmetrically with relation to the free gas turbine may be positioned parallel to the axis of the free gas turbine. In this instance the exhaust pipe 52 is connected to the bottom area of the turbine outer case 17 and as already indicated, the gas generators may be utilized in pairs using 2, 4, 6, etc., to produce the ultimate power required for the free gas turbine 10.

In a still further embodiment of this invention, referring to FIG. 7, the free gas turbine 10 may be provided with a plurality of gas generators preferably in balanced symmetrical pairs about the axis of the free gas turbine. In this embodiment the gas generators 11 may be positioned similar to the embodiment shown in FIG. 6 and in addition the gas generators 11 may be positioned on either side of the turbine outer case 17 to produce the desired gas flow to the free gas turbine 10.

Although the figures illustrate a plurality of generators such as the 4 gas generators shown in FIG. 7, it is apparent that the gas generators may be also equally spaced about the 360° of the free gas turbine 10 as in FIG. 1 thus providing a great many more generators without departing from the spirit of this invention. It is apparent that the gas generators may be positioned as in FIG. 1 on an axis that intersects with the axis of the shaft of the free gas turbine or the gas generators may be positioned as in FIG. 6 or 7 in a parallel arrangement to the shaft of the free gas turbine and although the generators are shown in a fairly close grouped relationship in FIG. 7 they may be readily spread out to be fairly remote from the free gas turbine 10 to provide a better distribution of weight such as on the aircraft without departing from the spirit of this invention and although a free gas turbine of a desired horsepower, for example a 400 horsepower, may be utilized, a plurality of smaller horsepower gas generators, for example providing a 100 horsepower output, may be utilized in combination such as shown in FIG. 1 or in FIG. 7 thus the power output of the free gas turbine may be varied from 400 horsepower, to 100 horsepower, 200 horsepower, 300 horsepower or 400 horsepower total and this is accomplished by simply starting one gas generator to produce the minimum 100 horsepower and then in turn starting the opposed generator to produce the 50% and in turn starting each of the other generators to increase the percentage of horsepower desired. Although a system of four generators has been illustrated, the division of power may be into many generators preferably spaced in a symmetrical pattern without departing from the spirit of this invention and although the generators are shown in a generally close formation, the generators may be positioned remotely without departing from the spirit of this invention and although an adjustable relief valve is utilized to produce a governing or on speed effect upon the burner pressure, any similar control to produce a predetermined burner pressure may be utilized without departing from the spirit of this invention and although the embodiments described provide a plurality of gas generators to drive a free gas turbine, a single gas generator or opposed pairs or a plurality of gas generators may be similarly connected to a gas driven turbine to increase its power output without departing from the spirit of this invention and this invention shall be limited only by the appended claim.

What is claimed is:

A free gas turbine driven by a plurality of gas generators in which said gas turbine is centrally positiond and said plurality of gas generators are disposed symmetrically about the axis of said gas turbine and in which each gas generator is comprised of a supporting frame with a burner, a radial flow compressor, a centripetal turbine and a shaft, said shaft retaining said compressor and said turbine mounted thereon, each of said gas generators provided with an inlet that is centripetal to the axis of the gas generator, said gas generators extending radially and at right angles to the axis of said free gas turbine and said gas generators being equally spaced about the axis of said free gas turbine and the axis of said gas generators being in the same horizontal plane so that the axis of each gas generator intersects the axis of said free gas turbine.

References Cited by the Examiner
UNITED STATES PATENTS

| | | | |
|---|---|---|---|
| 2,428,830 | 10/47 | Birmann | 60—35.6 |
| 2,601,194 | 6/52 | Whittle | 60—39.16 |
| 2,654,993 | 10/53 | Owner | 60—39.16 |
| 2,663,141 | 12/53 | Hage | 60—39.16 |
| 2,697,492 | 12/54 | Destival | 60—39.16 |
| 2,798,360 | 7/57 | Hazen et al. | 60—39.82 |
| 2,840,987 | 7/58 | Bloomberg et al. | 60—39.14 |
| 2,871,659 | 2/59 | Chamberlain et al. | 60—39.28 |
| 2,891,626 | 6/59 | Szydlowski | 60—39.28 |
| 2,912,824 | 11/59 | Van Nest et al. | 60—39.16 |
| 2,960,821 | 11/60 | Scherl | 60—39.14 |
| 2,988,882 | 6/61 | Hollings | 60—39.14 |
| 3,001,366 | 9/61 | Shutts | 60—39.82 |
| 3,087,691 | 4/63 | Rainbow | 60—39.16 X |
| 3,116,908 | 1/64 | Worskia | 60—39.16 X |

FOREIGN PATENTS

| | | |
|---|---|---|
| 1,172,989 | 10/58 | France. |

JULIUS E. WEST, *Primary Examiner.*

ABRAM BLUM, SAMUEL LEVINE, *Examiners.*